3,467,208
LOST CIRCULATION CONTROL
John Kelly, Jr., Arlington, Tex., assignor to Mobil Oil
Corporation, a corporation of New York
No Drawing. Filed Mar. 29, 1968, Ser. No. 717,380
Int. Cl. E21b 21/04, 33/13, 43/00
U.S. Cl. 175—72                                  8 Claims

ABSTRACT OF THE DISCLOSURE

This specification discloses a method of controlling lost circulation in drilling operations. In carrying out the invention an aqueous suspension of a water dispersible oleophilic colloid which is both water and oil dispersible is introduced into the drill string. The aqueous suspension is circulated through the drill string and into the well bore where it is contacted with an oleaginous liquid. The colloid is dispersed in the oleaginous liquid and forms a gel which tends to plug the formation into which lost circulation occurs. The oleophilic colloid may be a normally water-swellable clay such as bentonite which has been treated to render it oleophilic. The oleaginous liquid may comprise an oil-base drilling fluid utilized in drilling of the well.

BACKGROUND OF THE INVENTION

This invention relates to the drilling of wells into the earth's crust and, more particularly, to a new and improved method of lost circulation control in such drilling operations.

Typically, wells are extended into the earth's crust to desired subterranean locations, e.g., oil- and/or gas-bearing formations, through the application of rotary drilling techniques. In the rotary drilling of a well a drilling fluid is circulated through the well in order to remove the cuttings therefrom. The drilling fluid may be gaseous or liquid although in most rotary drilling procedures the drilling fluid comprises a suitable liquid, either alone or in the form of a "mud," i.e., a liquid medium having solids suspended therein. The drilling fluid may comprise either an aqueous-base or an oil-base liquid medium. The liquid medium used in an oil-base drilling fluid may be a relatively pure oleaginous liquid such as crude petroleum oil or diesel oil or it may be an "inverted" emulsion, i.e., a water-in-oil emulsion in which oil forms the continuous phase. Such oil-base fluids may be used to advantage where the formation being drilled is a suspected oil or gas producer or where unstable shale formations are encountered. In an aqueous-base drilling fluid, the liquid medium typically is fresh water, salt water, or an oil-in-water emulsion in which the water is the continuous phase. Where practical, it usually is desirable for reasons of economy to use an aqueous-base drilling fluid throughout much of the drilling operation.

The suspended solids in an aqueous-base drilling mud typically take the form of clays of the kaolinite, montmorillonite, or illite groups. Such clays are utilized to impart desirable thixotropic properties to the drilling mud and also serve to coat the walls of the well with a relatively impermeable sheath, commonly termed a "filter cake," which retards the loss of fluid from the well into the formations penetrated by the well. Exemplary of the clays which may be utilized in aqueous-base drilling muds is bentonite which is a montmorillonite-type clay. The bentonite is dispersed within the aqueous-base liquid as colloidal particles and imparts various degrees of thixotropy to the mud. Clays such as those described above, which have been rendered oleophilic by suitable treatment, may be used in oil-base drilling fluids. For example, the Bentones, which are formed by treating bentonites with long-chain amines, are thickening agents which are widely used in oil-base drilling fluids. Other materials such as lamp black and blown asphalt also may be used as viscosifiers in oil-base drilling fluids.

In addition to various clays such as mentioned above, a drilling fluid also may contain one or more weighting agents which function to increase the density of the fluid such that it will offset high pressures which may be encountered during the drilling operation. Examples of weighting agents which may be used in either aqueous-base or oil-base fluids are heavy minerals such as barite (barium sulfate) and galena (lead sulfide).

One difficulty which is often encountered in drilling operations is "lost circulation" which involves the loss of unacceptably large amounts of drilling fluid into a formation penetrated by the well. Such a formation is commonly termed a "lost circulation zone." Lost circulation may occur when the well encounters a formation of unusually high permeability or one which has naturally occurring fractures or fissures. Also a formation may be fractured by the hydrostatic pressure of the drilling fluid, particularly when a changeover is made to a relatively heavy mud in order to control high formation pressures.

Numerous techniques have been developed in order to control lost circulation. One common expedient is to increase the viscosity of the drilling fluid in order to increase its resistance to flow into the formation. Another technique involves the addition of bulk materials such as cottonseed hulls, sawdust, or ground walnut shells to the drilling fluid. Also, it has been proposed to place a "soft plug" such as a gel formed by a liquid-clay dispersion into the lost circulation zone. For example, as disclosed in U.S. Patent No. 2,800,964 to Garrick, a gel may be formed within the well by mixing an aqueous liquid and an oil dispersion of a hydrophilic clay and the gel forced into the lost circulation zone. In another procedure, a hydraulic cement slurry may be placed in the lost circulation zone and allowed to set.

SUMMARY OF THE IINVENTION

The present invention provides a new and improved method of alleviating the loss of drilling fluid into one or more formations penetrated by a well. The invention is practiced in conjunction with a conventional drilling procedure in which a drilling fluid is introduced into a drill string within the well and circulated downwardly through the string and thence upwardly through the well annulus surrounding the string. In accordance with the invention, an aqueous suspension of an oleophilic colloid which is both water and oil dispersible and which acts as a gelling agent when dispersed in an oleaginous liquid is introduced into the drill string. The aqueous suspension is circulated through the drill string and into the well bore where it is mixed with an oleaginous liquid. The colloid becomes dispersed in the oleaginous liquid to form a gel which tends to plug the formation into which circulation loss occurs.

DESCRIPTION OF THE SPECIFIC EMBODIMENTS

The gelling agent used in carrying out the present invention may be any suitable oleophilic colloid which is both water and oil dispersible and which exhibits good gelling action in an oleaginous liquid while exhibiting relatively little or no gelling action in an aqueous liquid. Particularly suitable for use in the present invention are the normally water-swellable clays which have undergone treatment to render them oleophilic. Exemplary of suitable oleophilic clays are the bentonites or other clays which have been treated with an oil-wetting surfactant such as a long-chain quaternary or non-quaternary amine. For a more detailed description of such clays and their method of preparation reference is made to Chemical Engineering, March 1952, pp. 226–230; U.S. Patent No. 2,531,812 to Hauser; and U.S. Patent No. 2,675,353 to Dawson. Suitable oleophilic clays also may be prepared by dehydrating a hydrophilic clay such as bentonite, and then treating the dehydrated clay with a glycol or glycol ether. For a more detailed description of this procedure, reference is made to U.S. Patent No. 2,637,692 to Nahin.

In rotary drilling there is employed a drill string which carries on its lower end a drill bit having one or more openings for the discharge of drilling mud from the drill string into the well. The drill string extends through a rotary table on the floor of the drilling rig and is supported by the rig through the means of a drawworks system. Typically, the drilling mud is withdrawn from a mud pit near the surface of the well and passed into the drill string via a rotary swivel. The drilling mud is pumped downwardly through the drill string and outwardly into the well bore through the outlet ports in the drill bit. The mud then is pumped to the surface of the well through the annulus between the drill string and the wall of the well. At the surface the mud may be passed through a suitable separation zone where drill cuttings and other entrained solids may be separated and thence passed to the mud pit for reintroduction into the drill string.

The invention normally will be used most advantageously in conjunction with a drilling procedure employing an oil-base drilling fluid and, accordingly, will be described first with reference to such a procedure.

When a lost circulation zone is encountered during the drilling procedure, as evidenced for example by a decrease or loss of drilling fluid return from the well annulus, the introduction of the drilling fluid in the drill string is temporarily suspended and a slug of an aqueous suspension of an oleophilic colloid such as described above is introduced into the drill string. Thereafter, the drilling fluid is again introduced into the drill string and the aqueous slug is entrained within the column of drilling fluid and circulated down through the drill string and thence into the well bore through the outlet ports of the drill bit. As the aqueous suspension enters the well bore it is mixed with the oleaginous liquid provided by the oil-based drilling fluid and reacts with this liquid to form a gel.

Ideally, the drill bit will be located adjacent the lost circulation zone so that as the gel is forming, it is displaced immediately into the lost circulation zone where the gelling reaction continues until a stiff plug is formed, thus sealing the lost circulation zone. However, in many cases, the precise depth of the lost circulation zone will be unknown. In such cases, it is important to maintain circulation of the drilling fluid in order to ensure that the plug formed by the oleaginous liquid-colloid dispersion is forced into the lost circulation zone. Due to its thixotropic character, this plug will tend to stiffen after it is displaced into the formation where it is subject to lower shear stresses than while circulated within the well.

It is contemplated that in most cases adequate contact between the aqueous suspension of colloid and the oleaginous liquid can be obtained simply by passing the suspension through the outlet ports of the drill bit into the well. However, if more intimate mixing is desired, the drill string may be wtihdrawn from the well and equipped with a mixing sub such as that described in U.S. Patent No. 2,800,964. Thereafter, the drill string may be reinserted within the well and the aqueous suspension introduced as described above.

If desired a suitable oleaginous liquid, such as the oil-base drilling fluid used during normal operations, may be pumped down the well annulus in conjunction with circulation of the aqueous suspension through the drill string. These steps should be correlated such that fluid is being pumped into the annulus as the aqueous suspension is displaced from the drill string into the well bore. This will further promote mixing of the aqueous suspension and oleaginous liquid and will provide a continuous supply of oleaginous liquid to the mixing zone.

By introducing the aqueous suspension of oleophilic colloid into the drill string as a discrete slug, the possibility of significant contact between the oleophilic colloid and the oil-base drilling fluid within the drill string is substantially reduced. Thus, the tendency of the oleophilic colloid to go into an oleaginous dispersion within the drill string is reduced with the result that there is little chance of forming a stiff gel within the drill string.

In order to further ensure against the oleophilic colloid contacting the oil-base drilling fluid within the drill string, it is preferred in carrying out the invention to immediately precede the aqueous suspension of oleophilic colloid with a liquid buffer system comprising an aqueous liquid such as fresh water, brine, or if desired, an aqueous-base drilling fluid having hydrophilic clays dispersed therein. The buffer system normally will comprise a relatively small amount, e.g., on the order of one-half to five barrels, depending upon the depth to the end of the drill string which typically may vary from about 1,000 to 25,000 feet. A large amount of the liquid buffer system normally should be avoided in order to ensure that contact of the aqueous suspension of oleophilic colloid and the oil-base drilling fluid will take place after the aqueous suspension enters the well from the drill string. The aqueous buffer liquid should, of course, be substantially free of oleophilic colloids.

It also will be desirable in many cases to introduce a second buffer system into the drill string immediately following the aqueous suspension of oleophilic colloid. This buffer system, which may be identical to the first-injected buffer system, is utilized in order to reduce the possibility of contact within the drill string between the aqueous suspension of oleophilic colloid and the subsequently introduced oil-base drilling fluid.

Where the oil-base drilling fluid is an inverted emulsion, it usually will be desirable to utilize as the buffer system an aqueous liquid as described above which is preceded by a substantially water-free oleaginous liquid such as diesel oil, crude oil, etc. The oleaginous buffer liquid is employed in this instance primarily for the purpose of preventing direct contact within the drill pipe between the aqueous buffer liquid and the inverted emulsion which may cause the emulsion to revert to an oil-in-water emulsion. A second buffer system comprising a slug of aqueous buffer liquid followed by a slug of oleaginous buffer liquid may be introduced into the drill string immediately following the aqueous suspension of oleophilic colloid. The amount of oleaginous liquid used in such buffer systems may be relatively small, e.g., on the order of one-half to two and one-half barrels, depending upon the depth of the well.

When drilling with an aqueous-base drilling fluid a procedure similar to that described above may be carried out when lost circulation occurs. In this case, introduction of the aqueous-base drilling fluid into the drill string is suspended and an aqueous suspension of an oleophilic colloid is introduced into the drill string and circulated downwardly therethrough and into the well bore. Preceding and/or following the aqueous suspension an oleaginous liquid such as diesel oil, crude oil, etc. is introduced into the drill string. This oleaginous liquid functions to provide a source of dispersant for the oleophilic colloid within the well bore from which a gel may be formed and, accordingly, should be introduced in an amount adequate for this purpose. For example, it usually will be desirable to introduce at least five barrels of the oleaginous liquid. Preferably, the oleaginous liquid is introduced into the drill string ahead of the aqueous suspension such that it will be present within the well bore when the aqueous suspension enters the well bore from the drill string. Also, it usually will be desirable to introduce a buffer system of an aqueous liquid into the drill string between the oleaginous liquid and the aqueous suspension. This buffer liquid functions similarly as described above in order to prevent premature contact between the aqueous suspension and the oleaginous liquid.

In laboratory tests carried out with regard to the invention, oleophilic clays were dispersed in water and the resulting aqueous dispersions then mixed with diesel oil. In one test the clay used was one prepared by treating bentonite, sodium form, with a long-chain quaternary ammonium salt, and which is available under the tradename "Geltone." In the test procedure, 50 grams of clay were added to 175 cubic centimeters of fresh water and the resulting dispersion mixed for about ten minutes. The dispersion was observed to foam somewhat upon agitation but the result was an easily flowable aqueous dispersion exhibiting a viscosity of about 15 centipoises and a yield point of zero. Thereafter, the equeous dispersion was added to 175 cubic centimeters of diesel oil and the diesel oil-aqueous dispersion mixture was agitated. The mixture was immediately observed to form a stiff gel and the water broke free into a separate phase. In shear tests carried out on the gel, a Shearometer tube weighted with 100 grams was observed not to penetrate the gel whereas a tube plug weighted with 200 grams was observed to penetrate the gel by only one-half inch.

Another test was carried out with an oleophilic clay prepared by treating attapulgite with a long-chain quaternary ammonium salt. This clay is available under the tradename "Petrotone." In this test 50 grams of Petrotone were added to 225 cubic centimeters of fresh water and the resultant dispersion was agitated for about five minutes. This dispersion was somewhat less fluid than the aqueous dispersion prepared in the first test described above. The dispersion exhibited a viscosity of about 6 centipoises and a yield point of 11 pounds/100 square feet. After formation of the aqueous dispersion, 175 cubic centimeters of diesel oil were added and on the resulting mixture was agitated. As in the first test, a gel was formed and the water broke free into a separate phase. However, in this case, the gel exhibited a lower gel strength than that formed in the first test.

Having described specific embodiments of the instant invention, it will be understood that further modifications thereof may be suggested to those skilled in the art, and it is intended to cover all such modifications as fall within the scope of the appended claims.

What is claimed is:

1. In the drilling of a well, the method of alleviating fluid loss into a subterranean formation penetrated by said well, comprising:
   introducing into a drill string within said well an aqueous suspension of a water-dispersible oleophilic colloid which acts as an oleaginous gelling agent;
   circulating said aqueous suspension down said drill string and into the well bore externally of said drill string; and
   mixing said aqueous suspension with an oleaginous liquid whereby said oleophilic colloid is dispersed in said oleaginous liquid and forms a gel.

2. The method of claim 1 wherein said oleophilic colloid is a normally water-swellable clay which has been treated to render it oleophilic.

3. The method of claim 1 wherein said oleaginous liquid comprises an oil-base drilling fluid present in said well when said aqueous suspension is introduced.

4. The method of claim 3 further comprising introducing a buffer system including an aqueous liquid into said drill string prior to the introduction of said aqueous suspension.

5. The method of claim 4 further comprising, subsequent to the introduction of said aqueous suspension, introducing a second buffer system including an aqueous liquid into said drill string and thereafter introducing said oil-base drilling fluid into said drill string.

6. The method of claim 4 wherein said oil-base drilling fluid comprises a water-in-oil emulsion and further comprising introducing a substantially water-free oleaginous liquid into said drill string prior to said aqueous liquid.

7. The method of claim 1 wherein an aqueous-base drilling fluid is circulated in the drilling of said well, the circulation of said drilling fluid is temporarily suspended, and said aqueous suspension and oleaginous liquid are introduced into said drill string during said temporary suspension.

8. The method of claim 7 wherein said oleaginous liquid is introduced into said drill string prior to said aqueous suspension.

References Cited

UNITED STATES PATENTS

| | | | |
|---|---|---|---|
| 2,531,812 | 11/1950 | Hauser | 252—8.5 |
| 2,637,692 | 5/1953 | Nahin | 252—8.5 |
| 2,675,353 | 4/1954 | Dawson | 252—8.5 |
| 2,776,010 | 1/1957 | Rike | 166—21 |
| 2,776,112 | 1/1957 | Ilfrey et al. | 252—8.5 X |
| 2,776,713 | 1/1957 | Morgan et al. | 166—29 X |
| 2,800,964 | 7/1957 | Garrick | 166—29 |
| 2,806,531 | 9/1957 | Morgan et al. | 166—38 X |
| 2,960,465 | 11/1960 | Ten Brink | 252—8.5 |
| 2,990,016 | 6/1961 | Goins et al. | 166—29 |
| 3,210,274 | 10/1965 | Caruso | 252—8.5 X |

STEVEN J. NOVOSAD, Primary Examiner

U.S. Cl. X.R.

166—32, 38